United States Patent
Beskrovny et al.

(10) Patent No.: US 10,275,238 B2
(45) Date of Patent: Apr. 30, 2019

(54) HYBRID PROGRAM ANALYSIS

(71) Applicant: International Business Machines Corporation, Armonk, NY (US)

(72) Inventors: Evgeny Beskrovny, Ramat Gab (IL); Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 13/672,165

(22) Filed: Nov. 8, 2012

(65) Prior Publication Data

US 2014/0130019 A1 May 8, 2014

Related U.S. Application Data

(63) Continuation of application No. 13/670,270, filed on Nov. 6, 2012.

(51) Int. Cl.
*G06F 8/74* (2018.01)
*G06F 11/36* (2006.01)

(52) U.S. Cl.
CPC ............ *G06F 8/74* (2013.01); *G06F 11/3684* (2013.01)

(58) Field of Classification Search
USPC ................................................. 717/124–125
See application file for complete search history.

(56) References Cited

U.S. PATENT DOCUMENTS

| 5,522,036 | A | 5/1996 | Shapiro |
| 8,726,392 | B1 * | 5/2014 | McCorkendale ....... G06F 21/56 |
| | | | 713/188 |
| 2007/0008887 | A1 | 1/2007 | Gorbatov et al. |
| 2007/0050427 | A1 | 3/2007 | Atkin |
| 2009/0100415 | A1 * | 4/2009 | Dor et al. ..................... 717/131 |
| 2010/0031238 | A1 | 2/2010 | Li |
| 2011/0016441 | A1 | 1/2011 | Baumgartner et al. |
| 2012/0167060 | A1 * | 6/2012 | Landwehr ........... G06F 11/3604 |
| | | | 717/132 |

(Continued)

FOREIGN PATENT DOCUMENTS

| CN | 101968766 | 2/2011 |
| CN | 102073825 | 5/2011 |

OTHER PUBLICATIONS

Patrick Munier, WO 2009/095741, Aug. 6, 2009, WIPO.*

(Continued)

*Primary Examiner* — Wynuel S Aquino
(74) *Attorney, Agent, or Firm* — Daniel P. Morris, Esq.; Hoffmann & Baron, LLP

(57) ABSTRACT

A hybrid program analysis method includes initiating a static program analysis of an application, generating, by a static program analyzer, a query to a dynamic program analyzer upon determining a code construct of the application requiring dynamic analysis, resolving, by the dynamic program analyzer, the query into a set of arguments with which to invoke the code construct of the application, generating, by the dynamic program analyzer, the set of arguments, invoking, by the dynamic program analyzer, the code construct of the application using set of arguments, answering, by the dynamic program analyzer, the query, and continuing the static program analysis of the application.

27 Claims, 4 Drawing Sheets

(56) References Cited

U.S. PATENT DOCUMENTS

2012/0233599 A1* 9/2012 Valdiviezo Basauri et al. ............ 717/126

OTHER PUBLICATIONS

Musard Balliu et al., "A Weakest Precondition Approach to Robustness," Transactions on Computational Science X, Mar. 9, 2011, vol. 6340, pp. 261-297, Springer-Verlag, Berlin, Heidelberg.
Satish Chandra et al., "Snugglebug: A Powerful Approach to Weakest Preconditions," In Proceedings of the 2009 ACM SIGPLAN Conference on Programming Language Design and Implementation, Jun. 2009, pp. 363-374, ACM, New York, NY, USA.
Bjorn Dobel, "Improving System Performance using Application-Level Hints," Technische Universität Dresden, Department of Computer Science, Operating Systems Group, Jun. 8, 2005.

\* cited by examiner

HYBRID PROGRAM ANALYSIS

CROSS-REFERENCE TO RELATED APPLICATIONS

This application is a continuation of U.S. patent application Ser. No. 13/670,270 filed on Nov. 6, 2012, the complete disclosure of which is expressly incorporated herein by reference in its entirety for all purposes.

BACKGROUND

This disclosure relates to program analysis, and more particularly, to a hybrid program analysis.

The process of program analysis may generally be divided into two groups, static program analysis and dynamic program analysis. In static program analysis, an analysis of computer software may be performed without executing the application being analyzed. In dynamic program analysis, the application is executed on a real or virtual processor using test inputs during an analysis.

Static program analysis is generally considered undecidable according to Rice's theorem. Rice's theorem states that, for any non-trivial property of partial functions, there is no general and effective method to determine whether an algorithm determines a partial function with that property. Rice's theorem not only provides a theoretical upper bound, but also a limitation that's encountered by many analyses of practical interest.

Among these undecidable analyses are the problem of determining a precise set of called methods for a given call site (also known as pointer analysis) is undecidable, the problem of resolving reflective calls is undecidable, and problems related to string analysis and constant propagation.

Sound solutions for the above problems typically suffer from poor precision. For example, the result of a call (in Java) to Class.newInstance can be approximated as all possible types in the class hierarchy of the subject application. However, the approximation of the result yields an imprecise and un-scalable analysis.

An improved technique has been introduced to perform a two-stage analysis, where a dynamic program analysis is first run to determine dynamic hints for an ensuing static analysis, which may then use the dynamic hints for modeling of challenging code constructs. For example, in the case of Class.newInstance, the dynamic analysis records the exact types of objects allocated by the newInstance call, and then the static program analysis may use this data for pointer analysis to resolve virtual calls. While it is generally understood that such reliance on dynamic program analysis is unsound, the problems targeted by the two-stage analysis are undecidable and sound approximate solutions are often prohibitive in their loss of precision. That is, the two-stage analysis is merely an improved compromise as compared to static program analysis.

BRIEF SUMMARY

According to an embodiment of the present disclosure, a hybrid program analysis method includes initiating a static program analysis of an application, generating, by a static program analyzer, a query to a dynamic program analyzer upon determining a code construct of the application requiring dynamic analysis, passing control from the static program analyzer to the dynamic program analyzer and initiating a dynamic program analysis of the code construct, resolving, by the dynamic program analyzer, the query into a set of arguments with which to invoke the code construct of the application, generating, by the dynamic program analyzer, the set of arguments, invoking, by the dynamic program analyzer, the code construct of the application using set of arguments, answering, by the dynamic program analyzer, the query, and passing control from the dynamic program analyzer to the static program analyzer and continuing the static program analysis of the application.

According to an embodiment of the present disclosure, a computer program product for performing a hybrid program analysis comprises a computer readable storage medium having computer readable program code embodied therewith, the computer readable program code comprising computer readable program code configured to perform the hybrid program analysis.

According to an embodiment of the present disclosure, a hybrid program analysis system comprises a memory device storing a plurality of instructions embodying the system and an application, and a processor configured to receive the application and execute the plurality of instructions to perform a method comprising initiating a static program analysis of the application, generating, by a static program analyzer, a query to a dynamic program analyzer upon determining a code construct of the application requiring dynamic analysis, resolving, by the dynamic program analyzer, the query into a set of arguments with which to invoke the code construct of the application, generating, by the dynamic program analyzer, the set of arguments, invoking, by the dynamic program analyzer, the code construct of the application using the set of arguments, returning, by the dynamic program analyzer, an answer corresponding to the query to the static program analyzer, and continuing the static program analysis of the application.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an illustrative embodiment of the present disclosure, a framework is implemented for a hybrid method of program analysis including a static program analysis and a dynamic program analysis. It should be understood, however, that embodiments of the disclosure are not limited to the particular methods and/or apparatus described herein. Rather, embodiments of the disclosure are more broadly related to enhanced techniques for performing program analysis. Furthermore, although reference may be made herein to specific software (e.g., Java), syntax, protocols, operating platforms (hardware or software), etc., embodiments of the disclosure are not limited to such software, syntax, protocols, operating platforms, etc. Moreover, it will become apparent to those skilled in the art given the teachings herein that numerous modifications can be made to the embodiments shown that are within the scope of the claimed invention. That is, no limitations with respect to embodiments shown and described herein are intended or should be inferred.

Figure 1:
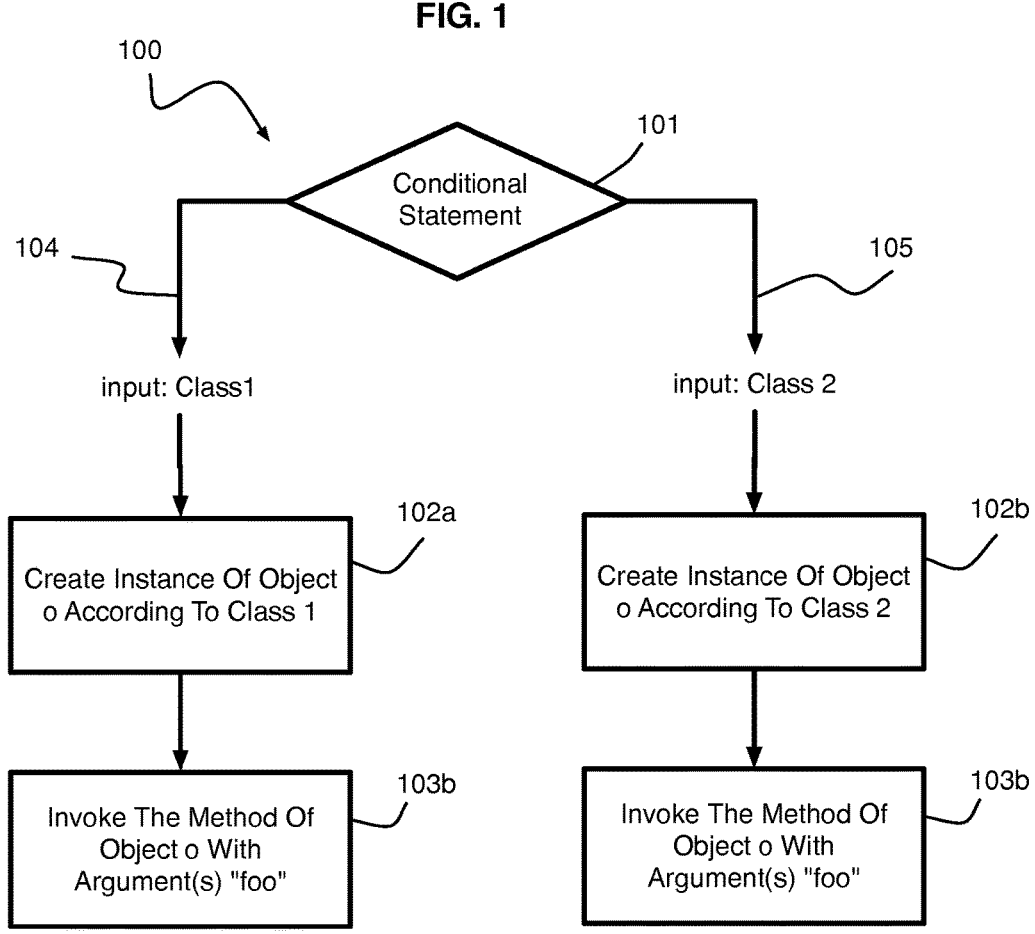
FIG. 1 is a flow diagram of a routine for purposes of explaining an exemplary embodiment of the present disclosure.

Reference will now be made to an exemplary routine 100 as shown in FIG. 1 for purposes of describing an embodiment of the present disclosure. According to an embodiment of the present disclosure, the hybrid method may provide precise input arguments for use in the dynamic program analysis for runs or executions of given computer readable instructions, with knowledge of which queries the static scanner will place. Having control over the input arguments, the response of the dynamic program analysis is made specific for program runs that are appropriate for answering the query posed by a static analyzer.

Consider the following example (in Java syntax):
Class c;
if (*) // see block 101
i. c=Class1.class;
else
ii. c=Class2.class;
Object o=c.newInstance( ); // see block 102a-102b
Method.invoke(o, "foo"); // see block 103a-103b

In this example, the input arguments chosen by a dynamic analyzer may all lead down a selected branch (104 or 105) of a conditional statement 101. Then, when the static analyzer asks about the possible types flowing into Object o, the answer by the dynamic program analysis is Class1 and Class2.

In view of the foregoing, and according to an embodiment of the present disclosure, the dynamic program analysis is specialized for a query at hand. The specialization of the dynamic program analysis enables precise information for the specific control flow corresponding to the query to be obtained, as illustrated in the example above. For example, a dynamic program analysis, initiated at the point (e.g., a false branch) where the static program analysis queries an answer, enables a concise and precise answer, as the dynamic analyzer is pointed toward a particular control flow.

Figure 2:
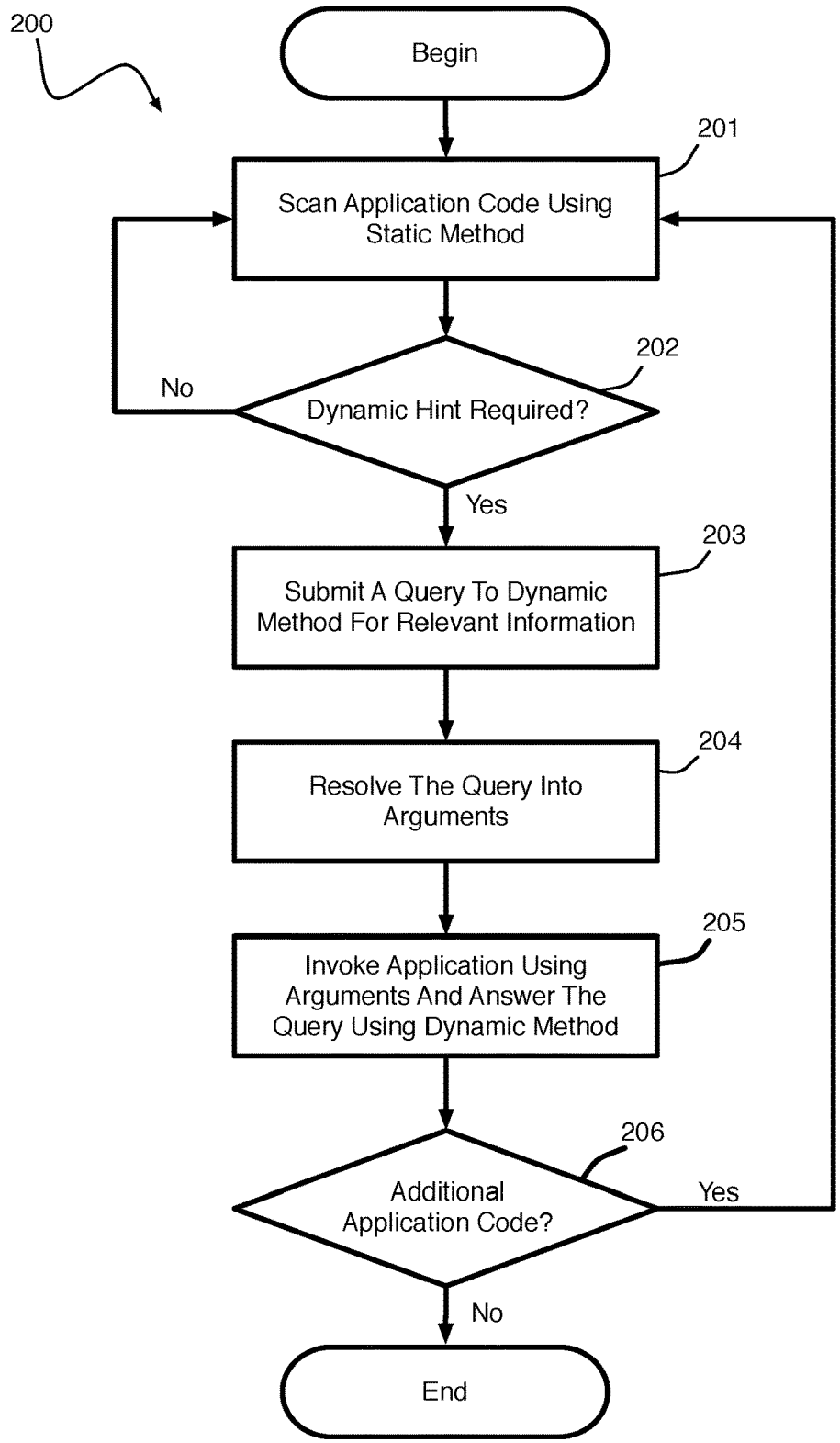
FIG. 2 is flow diagram of an illustrative method for a hybrid method of program analysis according to an embodiment of the present disclosure.

FIG. 2 is flow diagram of an illustrative hybrid method of program analysis 200 according to an embodiment of the present disclosure. More particularly, with reference to FIG. 2, a hybrid method of program analysis 200 includes a static program analysis of application code at 201. Upon reaching a code construct where a dynamic analyzer is required at 202, a static analyzer submits a query to the dynamic analyzer to retrieve relevant information at 203.

Referring to block 202, any piece of information that affects the precision of the static analysis, but is not modeled in the abstraction maintained by the analysis, can trigger a query. This includes reflective constructs, evaluation of conditional branches, external content (e.g., coming from databases or files), etc.

The relevant information may include possible types allocated by a newInstance statement, etc. The request may be associated with contextual information. The dynamic analyzer resolves the request, along with the contextual information, into one or more sets of arguments with which to invoke the subject application at 204. Examples of these arguments include command-line arguments, or more generally, data inputs, which would lead execution down a desired code path.

Symbolic analysis techniques, such as a demand-driven symbolic analysis for object-oriented programs and frameworks, may be used to resolve the input arguments. For example, the extraction of input arguments may be treated as a goal-reachability problem, wherein semantics of all statements, including inter-procedural flow and exceptional conditions, are modeled. In an exemplary implementation, when the analysis finds a precondition P for postcondition R, the analysis guarantees that any state which satisfies P must necessarily drive program execution to R. No other exceptions will be thrown before reaching R.

In a further exemplary implementation, the goal-reachability problem is based on a backward symbolic analysis. In principle, such an analysis computes weakest preconditions (described herein) over each control-flow path, going backwards from the goal statement to an input argument. If the computed precondition P for any path r is satisfiable, then a satisfying assignment for P gives the input arguments that would force execution along r to the goal.

The application is then invoked and the query answered by the dynamic analyzer at 205. If, for example, the query is for a possible resolution of a reflective allocation in the routine above, then the answer would be Class1. If the query concerns the evaluation of a conditional branch, then the answer would be true or false. In view of the foregoing, the answer may take various forms. The exemplary answers described herein are not intended to be limiting.

The hybrid method 200 continues if additional application code is available at 206 with the static analyzer at 201. The hybrid method 200 takes application code as input and outputs application properties (see FIG. 3). The application properties may reveal application behaviors, and may include application metrics (e.g., objective, reproducible and quantifiable measurements of application behavior).

In view of the foregoing, a dynamic program analysis may be specialized for a query at hand.

Figure 3:
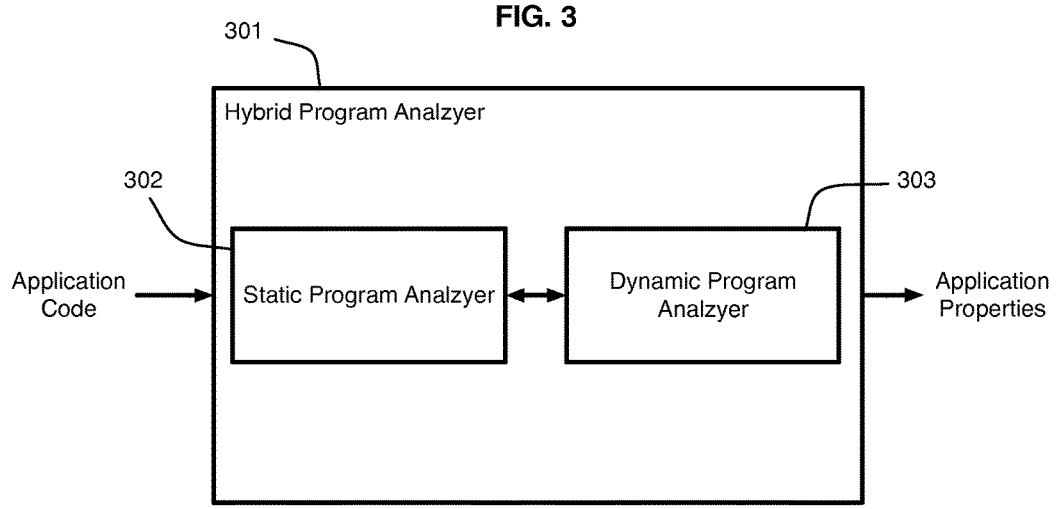
FIG. 3 is a block diagram depicting an exemplary computer system for performing a method for hybrid method of program analysis according to an embodiment of the present disclosure.

In view of the foregoing, and referring to FIG. 3, at least a portion of an exemplary hybrid program analyzer 301 according to an embodiment of the disclosure includes a static program analyzer 302 and a dynamic program analyzer 303. The static program analyzer 302, in an illustrative embodiment, passes control of the application analysis to a dynamic program analyzer 303 at 202. Similarly, the dynamic program analyzer 303, in an illustrative embodiment, passes control of the application analysis back to the static program analyzer 302 at 206.

In view of FIG. 3, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In a non-limiting example, the modules include a first module, e.g., 302, which scans application code using a static program analysis, a second module, e.g., 303, which receives a query from the first module corresponding to a specific branch of the application, wherein the second module performs a dynamic program analysis in response to the query, and a third module, e.g., hybrid program analyzer, e.g., 301, that outputs properties of the application in accordance with the static program analysis and the dynamic program analysis. The method steps can then be carried out using the distinct software modules of the system, as described above, executing on one or more hardware processors.

Figure 4:
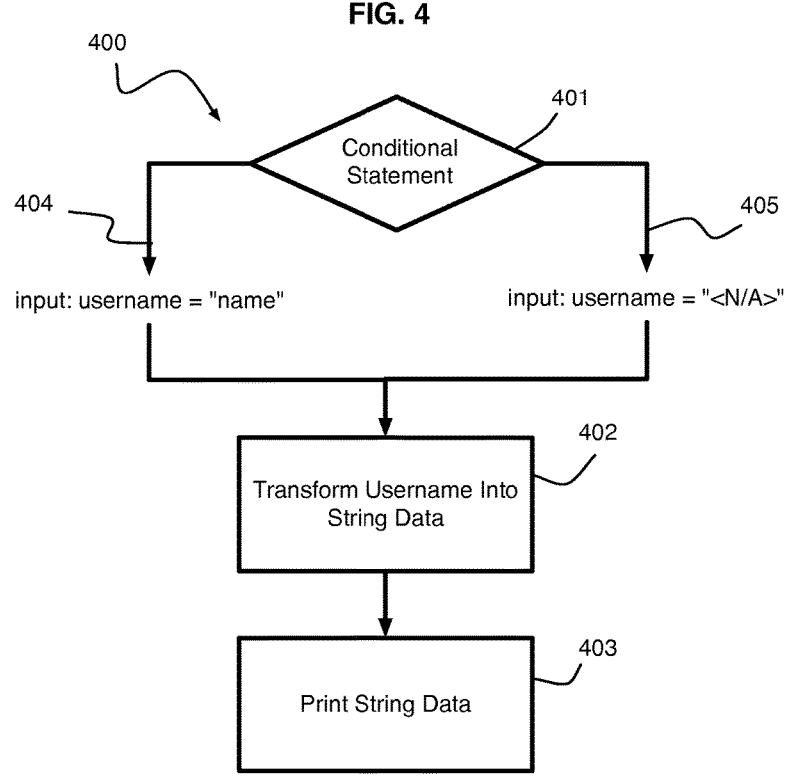
FIG. 4 is a flow diagram of a routine for purposes of explaining an exemplary embodiment of the present disclosure.

According to an embodiment of the present disclosure, and referring to the contextual information, an inherent aspect of static program analysis is data abstraction, which enables finite yet sound exploration of the state space of the application. For example, a common abstraction in security analysis is to use access paths to denote untrusted heap regions. The contextual information provided by the static program analysis includes the abstract state at the point where the query is issued. This may be illustrated via the following example of web-application security analysis 400 depicted in FIG. 4:

String username;
if (request.hasParameter("name")) {// see block 401
iii. username=request.getParameter("name");
iv. username=removeIllegalChars(username); // see branch 404}
else
v. username="<N/A>"; // see branch 405
String data=transform(username); // see block 402
response.getWriter( ).println(data); // see block 403

In this example, the getParameter call is a security source, which reads (untrusted) user-provided data. Further, the println call is a security sink that renders the data to the response HTML.

A possible query by the static program analysis is whether the data reaching the sink, that is the println call at block 403, contains certain characters (e.g., illegal characters '<' and '>'), in which case the above code is determined to be vulnerable.

A possible abstract state at the sink call is {username.*, data.*}, which denotes that the values pointed-to by username and data are untrusted due to the source call. With this context in place, the dynamic program analysis may synthesize test payloads that pass through the true branch of the conditional statement before arriving at the sink call.

According to an embodiment of the present disclosure, and referring to the translation into test input arguments, given the contextual information by the static analysis, which constrains—or focuses—the dynamic program analysis in its choice of which execution paths to visit based on data abstraction, the dynamic program analysis may map these constraints into input arguments to the application (see also block 204 in FIG. 2).

Well-known techniques may be used to map constraints into input arguments to the application, such as the weakest-precondition approach for test generation. The weakest-precondition approach attempts to find a solution for the constraint system induced by the contextual information provided by the static analysis, and the path constraints induced by backward traversal, that is outputs to input arguments, of the execution path connecting the program's entry location to the queried location. More formally, according to an exemplary implementation of the weakest-precondition approach, given a statement S, the weakest-precondition of S is a function mapping any postcondition R to a precondition. The result of this function, denoted wp(S, R), is the "weakest" precondition on the initial state or input argument ensuring that execution of S terminates in a final state satisfying R.

The weakest precondition semantics may be used to provide the greatest set of possible input arguments leading to the given output observation.

It should be understood that the term application as used herein may refer to individual statements and declarations in computer readable code, individual objects, complete source code of an application, etc. Similarly, embodiments described herein are not limited to source code and may be applied to object code. In summary, embodiments of the present disclosure are not limited to the analysis of certain levels or types of code and may be implemented in any case where program analysis is applicable.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 5:
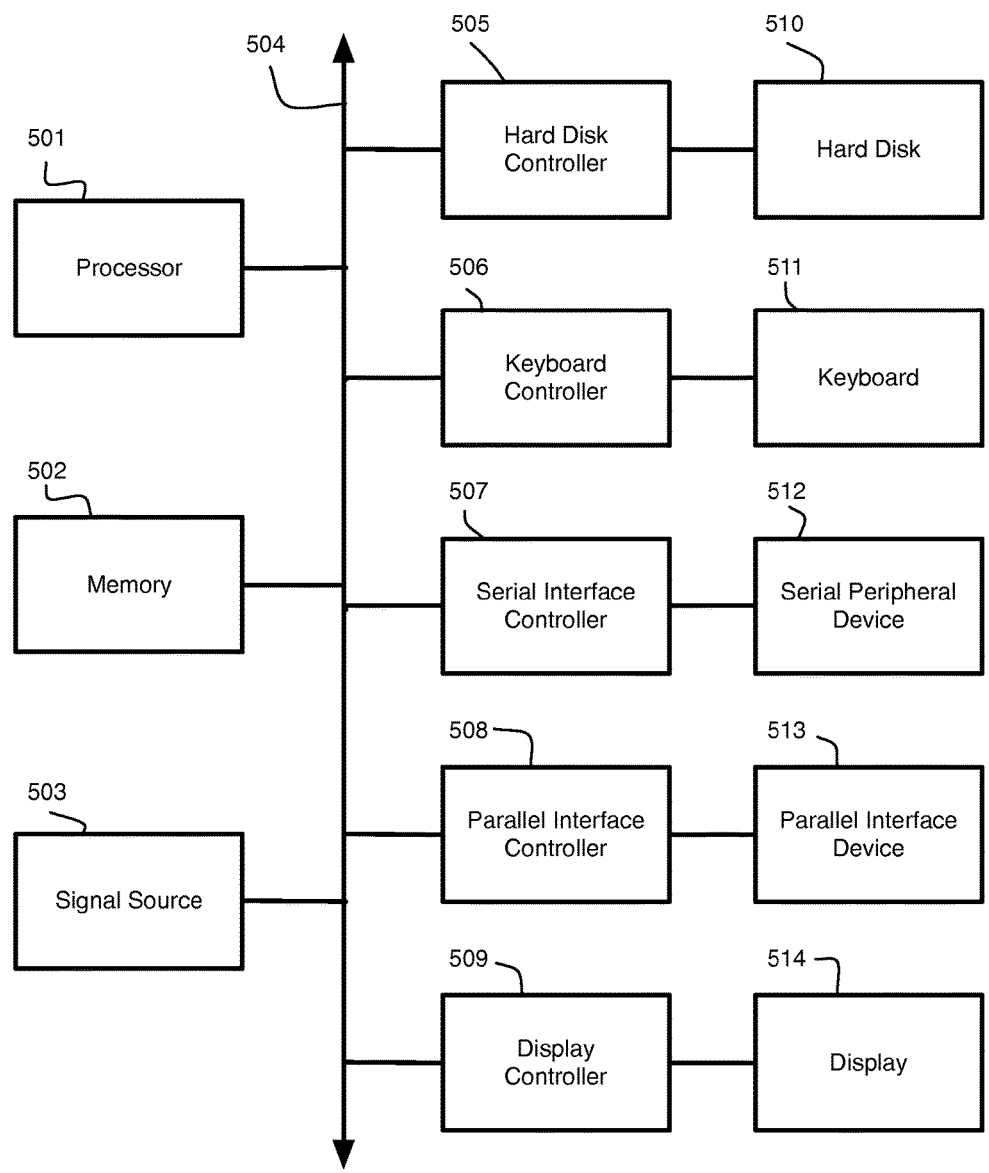
FIG. 5 is a block diagram depicting an exemplary computer system for performing a method for hybrid method of program analysis according to an embodiment of the present disclosure.

For example, FIG. 5 is a block diagram depicting an exemplary computer system for performing a hybrid method of program analysis according to an embodiment of the present disclosure. The computer system shown in FIG. 5 includes a processor 501, memory 502, signal source 503, system bus 504, Hard Drive (HD) controller 505, keyboard controller 506, serial interface controller 507, parallel interface controller 508, display controller 509, hard disk 510, keyboard 511, serial peripheral device 512, parallel peripheral device 513, and display 514.

In these components, the processor 501, memory 502, signal source 503, HD controller 505, keyboard controller 506, serial interface controller 507, parallel interface controller 508, display controller 509 are connected to the system bus 504. The hard disk 510 is connected to the HD controller 505. The keyboard 511 is connected to the keyboard controller 506. The serial peripheral device 512 is connected to the serial interface controller 507. The parallel peripheral device 513 is connected to the parallel interface controller 508. The display 514 is connected to the display controller 509.

In different applications, some of the components shown in FIG. 5 can be omitted. The whole system shown in FIG. 5 is controlled by computer readable instructions, which are generally stored in the hard disk 510, EPROM or other non-volatile storage such as software. The software can be downloaded from a network (not shown in the figures), stored in the hard disk 510. Alternatively, a software downloaded from a network can be loaded into the memory 502 and executed by the processor 501 so as to complete the function determined by the software.

The processor 501 may be configured to perform one or more methodologies described in the present disclosure, illustrative embodiments of which are shown in the above figures and described herein. Embodiments of the present disclosure can be implemented as a routine that is stored in memory 502 and executed by the processor 501 to process the signal from the signal source 503. As such, the computer system is a general-purpose computer system that becomes a specific purpose computer system when executing the routine of the present disclosure.

Although the computer system described in FIG. 5 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A computer program product for creating a configurable model for a hybrid program analysis, the computer program product comprising:
   a computer readable storage medium having computer readable program code embodied therewith, the computer readable program code comprising:
   computer readable program code configured to initiate a static program analysis of an application by a static program analyzer, wherein the static program analysis is performed without executing the application;
   computer readable program code configured to generate, by the static program analyzer, a query to a dynamic program analyzer upon determining at least a portion of the application requires a dynamic program analysis, wherein the dynamic program analysis comprises executing at least the portion of the application;
   computer readable program code configured to pass control from the static program analyzer to the dynamic program analyzer and initiating the dynamic program analysis of at least the portion of the application;
   computer readable program code configured to resolve, by the dynamic program analyzer, the query generated by the static program analyzer into a set of arguments with which to invoke at least the portion of the application;

computer readable program code configured to invoke, by the dynamic program analyzer, at least the portion of the application using the set of arguments to determine an answer to the query;

computer readable program code configured to return, by the dynamic program analyzer, the answer to the query to the static program analyzer;

computer readable program code configured to pass control from the dynamic program analyzer to the static program analyzer and continuing the static program analysis of the application; and computer readable program code configured to output one or more properties of the application determined based on the static program analysis and the dynamic program analysis.

2. A hybrid program analysis system comprising:

a memory device storing a plurality of instructions embodying the hybrid program analysis system and an application; and a processor configured to receive the application and execute the plurality of instructions to perform a method comprising:

initiating a static program analysis of the application by a static program analyzer, wherein the static program analysis is performed without executing the application;

generating, by the static program analyzer, a query to a dynamic program analyzer upon determining at least a portion of the application requires a dynamic program analysis, wherein the dynamic program analysis comprises executing at least the portion of the application;

passing control from the static program analyzer to the dynamic program analyzer and initiating the dynamic program analysis of at least the portion of the application;

resolving, by the dynamic program analyzer, the query generated by the static program analyzer into a set of arguments with which to invoke at least the portion of the application;

invoking, by the dynamic program analyzer, at least the portion of the application using the set of arguments to determine an answer to the query;

returning, by the dynamic program analyzer, the answer corresponding to the query to the static program analyzer;

passing control from the dynamic program analyzer to the static program analyzer and continuing the static program analysis of the application; and outputting one or more properties of the application determined based on the static program analysis and the dynamic program analysis.

3. A hybrid program analysis method comprising:

initiating a static program analysis of an application by a static program analyzer, wherein the static program analysis is performed without executing the application;

generating, by the static program analyzer, a query to a dynamic program analyzer upon determining at least a portion of the application requires a dynamic program analysis, wherein the dynamic program analysis comprises executing at least the portion of the application;

passing control from the static program analyzer to the dynamic program analyzer and initiating the dynamic program analysis of at least the portion of the application;

resolving, by the dynamic program analyzer, the query generated by the static program analyzer into a set of arguments with which to invoke at least the portion of the application;

invoking, by the dynamic program analyzer, at least the portion of the application using the set of arguments to determine an answer to the query;

returning, by the dynamic program analyzer, the answer to the query to the static program analyzer;

passing control from the dynamic program analyzer to the static program analyzer and continuing the static program analysis of the application; and outputting one or more properties of the application determined based on the static program analysis and the dynamic program analysis.

4. The hybrid method of claim 3, wherein the query generated by the static program analyzer includes contextual information for the portion of the application.

5. The hybrid method of claim 4, wherein the contextual information included in the query comprises an abstract state at a point in the application where the query is issued.

6. The hybrid method of claim 5, wherein, when executing at least the portion of the application, the dynamic program analyzer synthesizes test payloads based at least in part on the abstract state included in the query generated by the static program analyzer.

7. The hybrid method of claim 3, wherein the portion of the application requiring dynamic analysis is identified as affecting a precision of the static analysis, and further wherein the portion of the application is not modeled in an abstraction maintained by the static analysis.

8. The hybrid method of claim 3, wherein the portion of the application requiring the dynamic program analysis comprises a reflective construct allocation, and wherein the answer to the query comprises at least one class type allocated by the portion of the application invoked by the dynamic program analyzer.

9. The hybrid method of claim 3, wherein the portion of the application requiring the dynamic program analysis comprises an evaluation of a conditional branch in the application, and wherein the answer to the query comprises a true or false value generated when evaluating, by the dynamic program analyzer, the conditional branch in the application.

10. The hybrid method of claim 3, wherein the portion of the application requiring dynamic analysis is identified by the static analysis as content coming from a source external to the application, the source comprising at least one of a database and a file.

11. The hybrid method of claim 3, wherein the dynamic program analyzer executes at least the portion of the application in accordance with at least a particular control-flow path of the application.

12. The hybrid method of claim 11, wherein the invocation of the portion of the application using the set of arguments leads to execution by the dynamic program analyzer in accordance with at least the particular control-flow path of the application.

13. The hybrid method of claim 12, wherein the set of arguments includes a command-line argument corresponding to at least the particular control-flow path of the application.

14. The hybrid method of claim 12, wherein the set of arguments includes a data input corresponding to at least the particular control-flow path of the application.

15. The hybrid method of claim 11, wherein the query generated by the static program analyzer specifies at least the particular control-flow path of the application.

16. The hybrid method of claim 11, wherein the answer returned by the dynamic program analyzer comprises information specific to at least the particular control-flow path of the application.

17. The hybrid method of claim 11, wherein the static program analyzer specifies at least the particular control-flow path for the execution by the dynamic program analyzer.

18. The hybrid method of claim 11, wherein at least the particular control-flow path is subject to one or more constraints induced by contextual information provided by the static program analyzer in the query.

19. The hybrid method of claim 18, wherein the one or more constraints are based at least in part on data abstraction.

20. The hybrid method of claim 18, wherein resolving the query into the set of arguments comprises mapping the one or more constraints into the set of arguments.

21. The hybrid method of claim 20, wherein the mapping is further subject to one or more path constraints induced by backward traversal of the at least one particular control-flow path.

22. The hybrid method of claim 20, wherein mapping the one or more constraints into the set of arguments comprises implementation of a weakest-precondition approach for test generation.

23. The hybrid method of claim 3, wherein the static program analyzer specifies the set of arguments used by the dynamic program analyzer.

24. The hybrid method of claim 3, wherein resolving the query into a set of arguments comprises a demand-driven symbolic analysis.

25. The hybrid method of claim 3, wherein resolving the query into a set of arguments comprises a backward symbolic analysis.

26. The hybrid method of claim 3, wherein the one or more properties of the application comprise at least one of a behavior of the application and a metric of the application.

27. The hybrid method of claim 3, wherein the answer to the query comprises at least one class type allocated when the portion of the application is invoked by the dynamic program analyzer, and wherein continuing the static program analysis of the application comprises using the at least one allocated class type for pointer analysis to resolve one or more virtual calls.

* * * * *